INVENTORS
CLYDE B. FAVERTY
WILLIAM R. SHAVER
THEIR ATTORNEY

Oct. 27, 1959  C. B. FAVERTY ET AL  2,910,016
VEHICLE FLOOR CONSTRUCTION
Filed July 13, 1955  5 Sheets-Sheet 3

INVENTORS
CLYDE B. FAVERTY
WILLIAM R. SHAVER
BY Wayne Morris Russell
THEIR ATTORNEY Oct. 27, 1959     C. B. FAVERTY ET AL     2,910,016
VEHICLE FLOOR CONSTRUCTION
Filed July 13, 1955     5 Sheets-Sheet 4
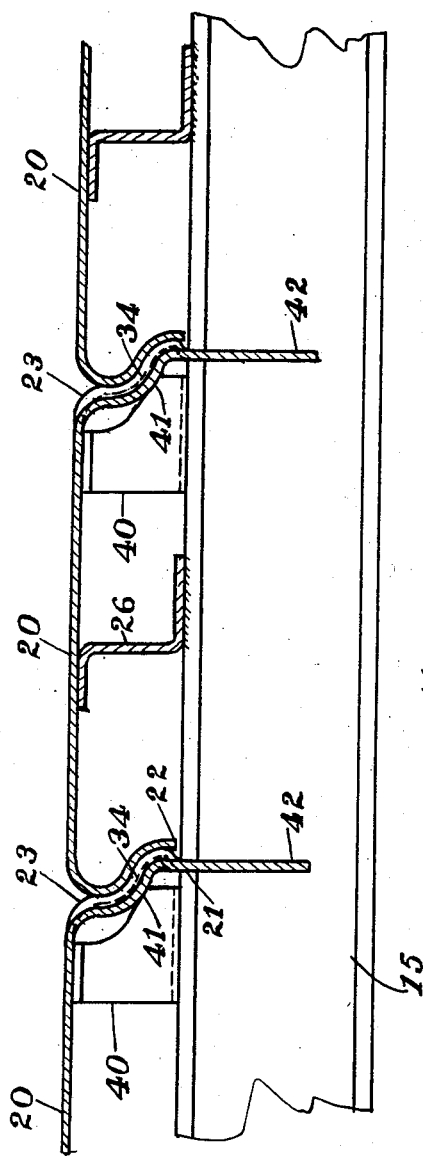
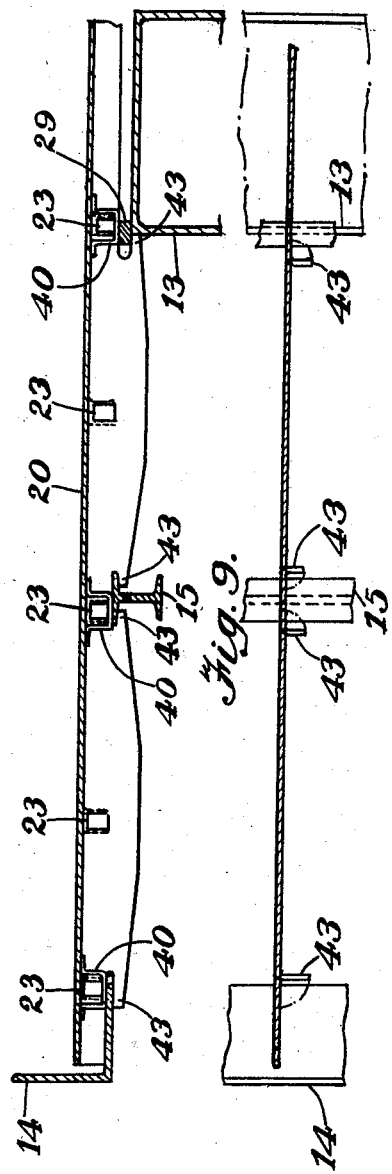
INVENTORS
CLYDE B. FAVERTY
WILLIAM R. SHAVER
THEIR ATTORNEY

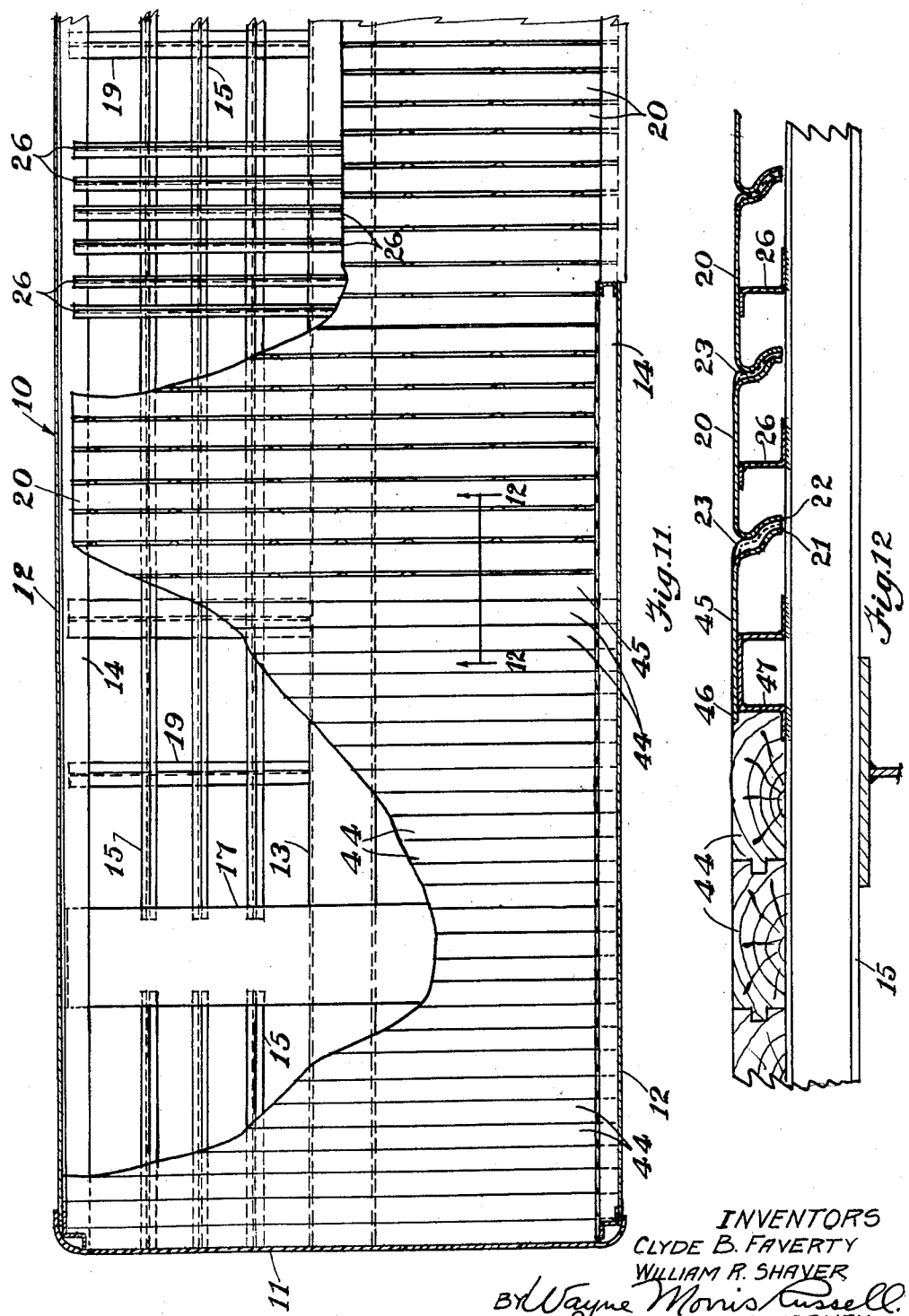

United States Patent Office 2,910,016
Patented Oct. 27, 1959

2,910,016

VEHICLE FLOOR CONSTRUCTION

Clyde B. Faverty, Evanston, Ill., and William R. Shaver, Highland, Ind., assignors to Pullman Incorporated, a corporation of Delaware Application July 13, 1955, Serial No. 521,858

3 Claims. (Cl. 105—422)

This invention relates to metal floor construction for vehicles and is directed primarily to a metal floor for railway freight cars.

The invention has for its principal object the provision of an all metal floor for freight vehicles which is nailable and which meets the requirements as to strength demanded by the heavy duty service to which such vehicles are subjected.

An object of the invention is the provision of a metal floor comprised of a plurality of planks disposed in parallel relationship and supported on an underframe structure by means of supporting members on the respective planks which provide the only engagement with the underframe.

Another object is to provide a metal floor comprised of a plurality of planks in parallel relationship having spacer means separating adjacent planks to provide nailing grooves, with supporting brackets which in combination with the spacer means provide mutual support and reinforcement for adjacent planks.

A further object comprehends a metal floor plank of generally channel section adapted for application to an underframe structure comprised of a center sill, side sills and intermediate stringers, with the plank extending across such members at an angle and wherein depending flanges on the plank are relatively deep between the sills and stringers to reinforce the plank between supports.

A still further object contemplates a metal floor plank of generally channel section for application to an underframe structure including a plurality of longitudinal members at an angle to such members with the flanges of the plank disposed downwardly and provided with bent tabs adapted to be straightened to engage under portions of the longitudinals to secure the planks in position.

Still another object of the invention involves the form of the nailing groove defined by the depending flanges on adjacent planks whereby the groove is provided with top and bottom vertical portions in offset relation and connected by a sloping portion which results in a full depth groove of a contour to afford uniformly positive clinching of nails driven therein and from which the nails may be removed without damage to the floor.

The invention also proposes the nailable metal floor construction in combination with wooden floor portions, with a joint between the wood and metal floor portions which interlocks the two types of floors and affords a strong connection which enables the wood floor portions to be jacked into position.

The foregoing and other objects of the invention are attained by the construction and arrangement illustrated in the accompanying drawings wherein Fig. 1 is a general plan view of a portion of a railway freight vehicle equipped with the floor structure of this invention;

Fig. 2 is a longitudinal sectional view through the vehicle floor taken on the line 2—2 of Fig. 1 adjacent the end of the vehicle;

Fig. 3 also is a longitudinal sectional view taken on the line 3—3 of Fig. 1 at the bolster area;

Fig. 4 too is a longitudinal sectional view taken on the line 4—4 adjacent the center of the vehicle;

Fig. 8 is a cross sectional view of the type of floor plank shown in Fig. 7 taken on the line 8—8 of Fig. 7;

Figure 1:
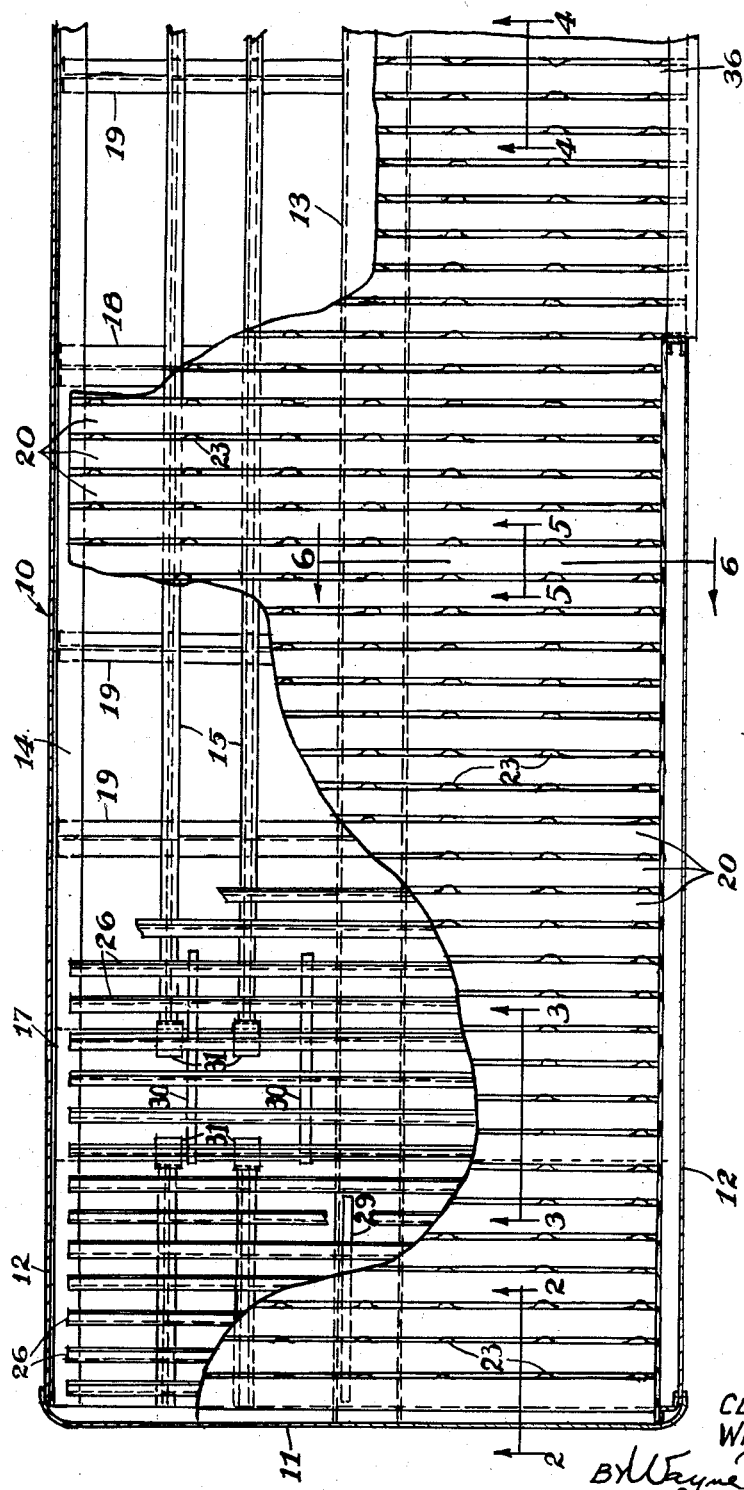
Figure 6:
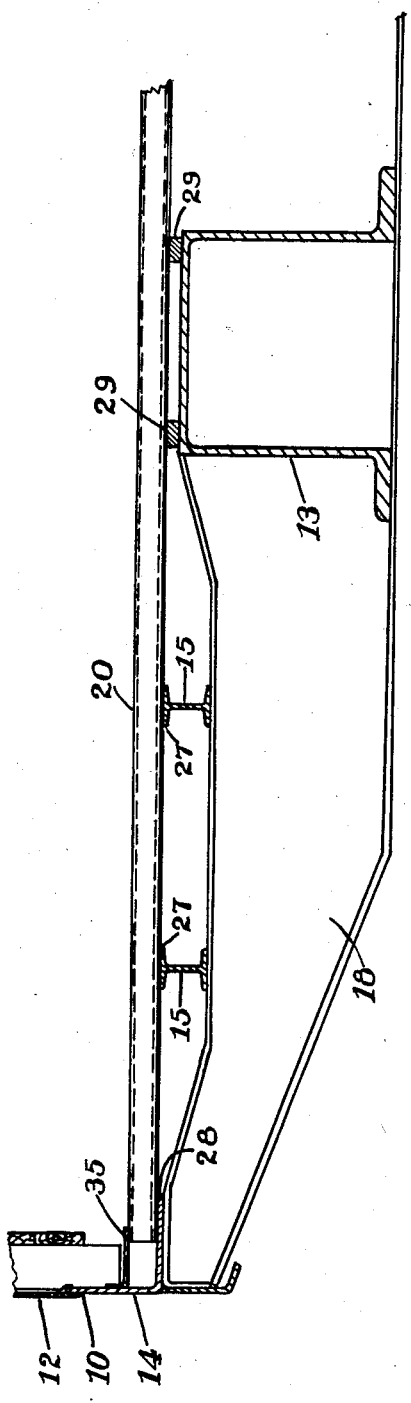
Fig. 6 is a transverse sectional view through the floor structure taken on the line 6—6 of Fig. 1.

Fig. 9 also is a transverse sectional view similar to Fig. 6 but showing a further modification of the floor plank structure;

Fig. 10 is another view of the structure shown in Fig. 9 and comprising a plan section illustrating the fastening means before attachment;

Fig. 11 is a plan view similar to Fig. 1 showing the metal floor structure of this invention used in combination with wooden floor portions adjacent the ends of the vehicle; and Fig. 12 is a sectional view taken on the line 12—12 of Fig. 11 showing the joint arrangement between the metal and wood floor portions.

In the drawings 10 represents a railway freight vehicle which, as shown in Fig. 1, is of the house car type and includes end wall 11, side walls 12 and an underframe comprised of center sill 13, side sills 14, stringers 15, and a plurality of cross members including end sills 16, bolsters 17, crossbearers 18 and crossties 19. The center and side sills extend full length of the vehicle, while the stringers extend continuously between the bolsters and with additional stringer sections extending between the bolsters and end sills. The various cross-members of the underframe extend between the center sill and respective side sills. The entire structure is fabricated and assembled by welding whereby to provide an integrated assembly.

Figure 5:
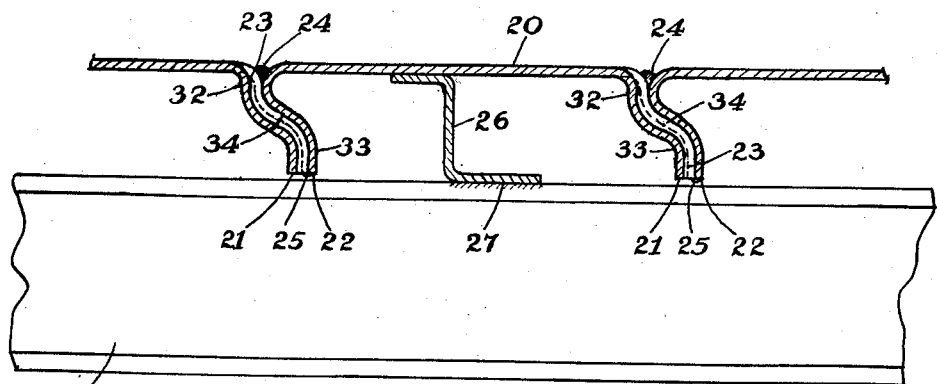
Fig. 5 is a detail longitudinal sectional view to larger scale taken on the line 5—5 of Fig. 1 through adjacent floor planks.

The metal floor of this invention is supported upon the underframe and secured by welding and is comprised of a plurality of juxtaposed metal floor planks 20 which extend continuously between the side sills and are disposed in spaced relation to provide nailing grooves between adjacent planks. The floor planks extend transversely of the vehicle and are of generally channel section with the flanges disposed downwardly so that the upwardly disposed web portions of the channels are disposed flush to provide a smooth surface floor throughout the interior area of the vehicle. The depending side flanges 21 and 22 of adjacent planks are disposed in complemental opposed relation, with sufficient space therebetween to provide a nailing groove at each juncture of adjacent planks. The planks are spaced apart by means of embossments 23 integral with the respective flanges 21 which are located at spaced intervals along the length of the plank and serve to space the flanges sufficiently to enable nails to be driven therebetween. Welds 24 and 25, located at the top and bottom respectively of the embossments, securely join adjacent planks together at these points (see Fig. 5).

The floor planks are each supported upon the underframe solely by means of an intermediate support member in the form of a Z-section 26 which extends continuously full length of the respective planks and which is spot welded to the underside of the horizontal web portion of each plank. The Z-section comprises the only support of each floor plank on the underframe and supports the planks above the level of all of the longitudinal members of the underframe so that the depending side flanges 21 and 22 are normally not in supporting contact with the center sill, stringers, or side sills. This imparts some resilience to the floor and helps to avoid damage to the individual planks as concentrated loads are brought into the vehicle and provides a floor having a smooth surface throughout its area since all of the adjoining planks may be disposed flush with each other without regard to manufacturing variations that otherwise might affect the relative height of the planks at their edges. The continuous intermediate supports 26 have their bottom flange portions resting upon and secured to the stringers and side sills by welding, as indicated at 27 and 28. At the center sill, each support is welded to filler members 29 which are secured on the top surface of the sill by welding. At the side sills the space between the ends of the metal floor and the upstanding flange of the side sill is closed by a continuous metal grain strip 35 overlying the floor and secured thereto and to the side sill by continuous welding to provide a tight closure against any possibility of leakage or infestation. At the bolsters where the stringers are interrupted, filler members 30 support the members 26 across the tops of the bolsters and are welded to the bottom flanges of the members 26 and to the bolster top cover plates. It will be noted that the stringers terminate at and are secured to brackets 31 which form the attachments therefor to the bolsters, and all integrated by welds.

The nailing groove between adjacent planks, formed by the depending flanges 21 and 22, is such that nails may be started more readily, are guided better, and the resistance throughout the driving of the nails is more uniform, retention is improved, and the nails can be removed more easily and practicably, all as compared to nailable metal structures heretofore available. The present nailing groove results in a more desirable contour of nails removed therefrom and the nails removed are more consistent, with less variation than those removed from other metal nailing members. In the present construction the nailing groove is provided with offset vertical groove portions 32 and 33 connected by a sloping groove portion 34 which in the arrangement shown is approximately thirty degrees from the vertical. The walls of the nailing groove defined by the depending flanges of the plank are in surface alignment, and the vertical portions 32 and 33 of the groove are connected with the sloping portion 34 by means of smoothly curving portions which guide the nails being driven so that the deflection from vertical is readily imparted as they are driven into the entering vertical groove and then easily deflected into the second vertical groove from the sloping portion as the nails are fully driven, thus to be held securely by a double clinching effect without deforming the nails to the extent that they cannot be removed without breaking or damage to the floor. The contour of the groove, with the offset vertical portions and intermediate sloping portions connected by smoothly curved portions, permits the nails to be extracted without damage to the floor members and without breaking the nails when it is desired to remove them.

Figure 4:
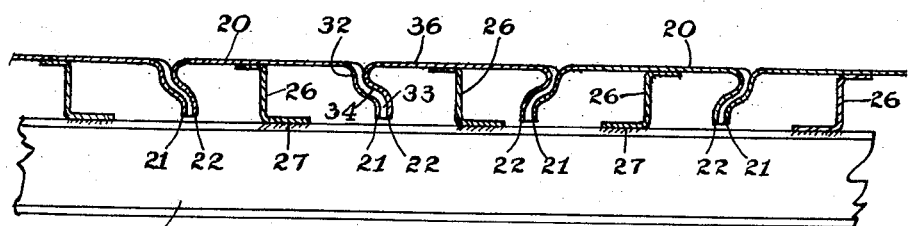

It will be noted that the general slope of the nailing grooves is toward the center of the vehicle from both ends of the vehicle, so that what might be termed a key plank, indicated at 36, is used as the center of the vehicle. This plank, as shown in Fig. 4, is provided with inwardly sloping flanges 22 at both sides so that the same type of floor planks 20 may be used on opposite sides thereof to the ends of the vehicle and thus provide nailing grooves all having their slope directed toward the center of the vehicle.

Figure 2:
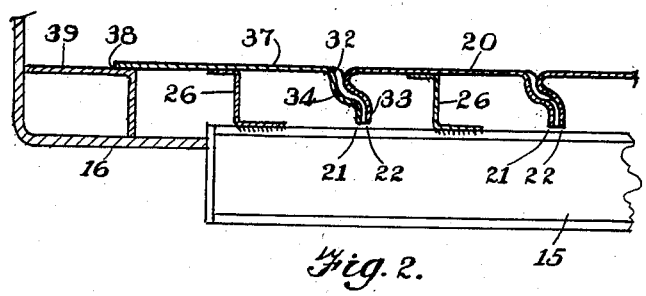
Figure 3:
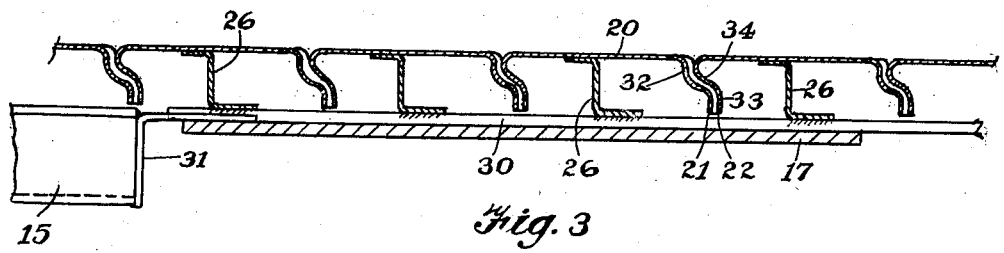

At the end sill 16, as best shown in Fig. 2, the end floor plank, designated 37, is provided with a depending flange 21 at only one side, and the opposite edge of the plank is formed by the horizontal web extending outwardly to overlie a supporting surface on the end sill as at 38. The supporting surface upon which the plank web lies is comprised of an angle member 39 which is disposed in an inverted position in relation to the end sill, with the flanges of the angle secured edgewise to the vertical and horizontal flanges of the end sill thereby to form a hollow fully closed section.

Figure 7:
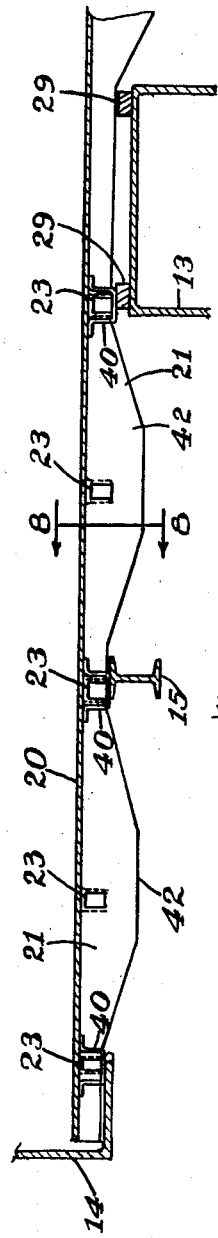
Fig. 7 is a transverse sectional view similar to Fig. 6 showing a modified form of floor plank construction.

As shown in Figs. 7 and 8, the floor planks 20 may be reinforced and stiffened by means of braces which support the side flanges 21 and 22 forming the nailing groove. In this arrangement the floor planks are spaced apart by the embossments 23 to form the nailing groove, and the embossments at the center sill, side sills and stringers are utilized in combination with braces 40 to reinforce and support both of the opposing flanges 21 and 22 of adjacent planks thereby to rigidify both planks at the groove. The brace 40, as shown, comprises an inverted hat section supported on the stringers and side sills and on the fillers 29 on the center sill, and the upstanding flanges of each hat section straddle the respective embossments 23 with their outstanding upper flanges secured beneath and supporting the web portion of the floor plank. As best shown in Fig. 8, the base portion of the inverted hat section 40 is of relatively greater width than the outstanding upper flanges, and the upstanding flanges are provided with portions 41 shaped to underlie and support the sloping portion 34 of the flange 21 on the floor plank. The supporting engagement of the upstanding flange portions 41 with the underside of the slope of flange 21 is at opposite sides of the embossment 23, as shown in Fig. 7, so that through the medium of this spacer means the flange 22 of the adjacent floor plank also is supported by the brace 40, thus rigidifying both the floor planks.

If additional beam strength is desired, one or both of the flanges 21 and 22 of the floor plank 20 may be made relatively deep in the areas between the center sill, stringers and side sills, as at 42. Where the greater depth is provided in one flange 21, as shown, the additional strength thus afforded is also developed by the other flange 22 through the connection of the spacer means 23, and the greater rigidification provided by this deep flange is obtained in the floor planks at opposite sides of the nailing groove.

Means for attaching the floor planks 20 to the center sill 13, stringers 15, and side sills 14, without the necessity for welding, are shown in Figs. 9 and 10. Here the depending side flanges of the planks are provided with bendable tabs 43 which, as shown, are normally bent for ready application of the floor planks to the underframe, after which the tabs may be straightened to engage beneath the flanges of the side sills and stringers, securely to hold the planks in position. At the center sill the fillers 29 are disposed to extend beyond the sides of the sill to provide a shoulder under which the tabs 43 are adapted to engage at this location to hold the planks in position. The bent position of the tabs 43 is illustrated in Fig. 10, from which they are adapted to be straightened to the locking position shown in Fig. 9.

Where it is desired to use the metal floor in less than the full length of the vehicle, as only in the center area thereof, the metal floor planks may be used in combination with wooden boards to provide a metal and wood floor, with the metal floor portions disposed in the area of greatest wear, as shown in Fig. 11. In this arrangement a substantial portion of the vehicle floor in the area through the doorways and for ample distances upon opposite sides thereof toward the ends of the vehicle to encompass all of the area subjected to the heaviest duty service, is comprised of metal floor planks 20, and from the ends of this metal floor to the respective ends of the vehicle the floor is comprised of wooden boards 44 which may be of the usual tongue and groove type. At the ends of the metal floor the last floor planks 45 are especially adapted to cooperate with the adjoining wood boards to provide an interlocking joint at each of the junctures between metal and wood floor portions. The plank 45 has depending flange 21 at one side for association with the next adjacent metal plank 20 and is provided with the intermediate support comparable to the member 26, but at the other side of the plank the depending flange is omitted and the horizontal web portion is extended outwardly, as at 46, to provide a flange overlying the wooden floor board, which is rabbeted out to receive the flange flush with the surface of the floor. A combined intermediate support and closure-and-support for the other side of plank 45 is provided in the form of a hat section 47 which may be spot welded to the underside of the plank web, and the outstanding base flanges are welded to the various longitudinal members of the underframe. The outstanding flange at the outer side of the plank is adapted to support the wooden floor board 44 which is received between this flange and the upper flange 46—the board being rabbeted out also to receive the base flange so that the floor boards may all have supporting engagement with the underframe longitudinals. With the metal floor portion installed, the wooden boards may be applied in the usual manner by jacking them into position between the end sill member and the abutment afforded by the hat section 47. In this operation the total number of boards to be installed are placed in position and form an arch between the abutment 47 and the end sill, and pressure is applied at the peak to force the boards downwardly against the underframe members and obtain a tight floor as the boards are compressed. The hat section connection 47 affords a strong abutment to resist the forces applied in this operation.

What is claimed is:

1. In a freight vehicle having an underframe including a plurality of laterally spaced longitudinal members having their upper surfaces disposed in a single plane, a metal floor structure supported on said members, said floor structure comprising a plurality of juxtaposed metal planks arranged at an angle to said members, each metal plank comprising a generally channel-shaped section having a horizontal web portion which forms the surface of the floor and having depending side flanges, means mounting said planks on said longitudinal members so as to dispose the web portions of contiguous planks in accurately flush co-planar relation regardless of variations in the widths of the side flanges of the planks comprising a support member secured to the longitudinal members and secured to the underside of said web portion of each plank substantially midway between the depending side flanges thereof and comprising the sole support of the plank on the longitudinal members, said support member being of a vertical extent greater than that of the depending side flanges, thereby spacing the bottom edges of the side flanges above said longitudinal members, and welds securing the adjacent side flanges of contiguous planks together in said accurately flush co-planar relation.

2. The combination claimed in claim 1, in which each support member comprises upper and lower flanges secured respectively to the plank and the longitudinal members and an intermediate web portion connecting said flanges.

3. The combination claimed in claim 1, in which each support member comprises a bar of Z-section having its upper flange secured to the plank and its lower flange secured to the longitudinal members.

References Cited in the file of this patent

UNITED STATES PATENTS

| | | |
|---|---|---|
| 2,028,554 | Main | Jan. 21, 1936 |
| 2,062,843 | Strand | Dec. 1, 1936 |
| 2,667,243 | Fenske | Jan. 26, 1954 |
| 2,675,896 | Van Pelt | Apr. 20, 1954 |
| 2,681,715 | Hansen | June 22, 1954 |